INVENTOR.
Harold C. Keysor
BY
Orrin O.B. Garner
Atty.

United States Patent Office 2,695,169
Patented Nov. 23, 1954

2,695,169

COIL SPRING

Harold C. Keysor, Chicago, Ill., assignor to American Steel Foundries, Chicago, Ill., a corporation of New Jersey Application November 30, 1949, Serial No. 130,320

8 Claims. (Cl. 267—60)

This invention relates to a spring product and method of making the same and more particularly to a helical compression spring.

A conventional compression spring comprises a bar coiled in a number of turns about a helix axis at a predetermined helical angle, the end portions of the bar being tapered to provide flat seats for opposite ends of the spring perpendicular to said axis. In compression, each end turn, approximately three-fourths of which comprises the related end portion, is engaged on its inner face by the outer face of the adjacent second or overlapping succeeding turn, the latter being curved tangentially with respect to and fulcruming with a rocking effect on the inner face of the former. Actually the second turn rolls up the associated end portion whereby the point of contact between the same constantly changes. This shifting of the points of contact is accentuated by the usual deformities on the inner faces of the end portions, the contact occurring at the high spots. As a result of these conditions the spring, under the variable loading, is eccentrically or nonaxially loaded with consequent unequal stress distribution which materially affects the life of the spring.

A general object of the invention is to provide a helical spring of such construction that the resultant load will always be axial.

A more specific object of the invention is to provide raised fulcrums between and fixed to one of the two turns at each end of the coil, the fulcrums being so arranged as to prevent shifting of the point of contact between related two turns.

In this connection, the invention contemplates locating these contact points in a common axial plane of the spring at opposite sides of the helix axis of the spring.

A broad object of the invention is to provide a method of axially loading helical springs.

Another object of the invention is to provide a method for economically forming such a spring.

These and other objects of the invention will become more apparent from the specification and drawing, wherein.

Figure 1:
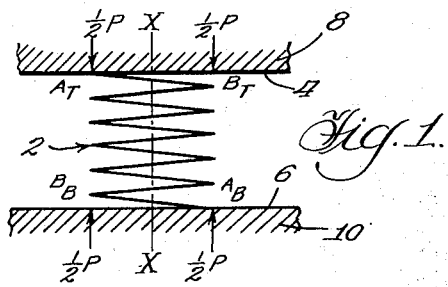
Figure 1 is a diagrammatic illustration of the invention.

Describing the invention in detail and referring first to Figures 1 to 6, the helical coil spring generally indicated 2 is shown diagrammatically in Figure 1 interposed between parallel plane surfaces 4 and 6 on the relatively movable loading members 8 and 10. The spring is formed from a bar 12 which encircles the axis X—X of the spring with a plurality of turns. The end portions 14 and 16 are tapered to provide flat seating surfaces 18 and 20, respectively, at opposite ends of the spring perpendicular to the helix axis X—X. The end portions 14 and 16 are deformed and offset inwardly of the spring adjacent their outer ends as at 22 and 24 to provide fulcrums 26 and 28 which project outwardly from the inner faces 30 and 32 of the end portions 14 and 16. The contact point between fulcrum 28 and the adjacent second or succeeding turn is indicated at $A_T$ and the contact point between fulcrum 26 and the adjacent second or succeeding turn is indicated at $A_B$. These points $A_T$ and $A_B$ are located in a common axial plane of the spring at opposite sides of the axis X—X. Expressed in turns of the coil, these points are spaced from each other at an angle equal to a whole number of turns plus one half turn, a turn being 360°, or, stated alternatively, the angle between $A_T$ and $A_B$ is equal to $N\pi$ where $N$ is any odd integral number.

For point A on each end turn there is a corresponding load point B on the same end turn at the diametrically opposite side of the axis X—X. Thus at the upper end of the spring as shown in Figure 1 the diametrically opposite points are $A_T$ and $B_T$ and at the lower end of the spring the diametrically opposite points are $A_B$ and $B_B$. It will be readily apparent that all the points A and B are in a common axial plane and that points $A_T$ and $B_B$ are aligned longitudinally of the spring and disposed at one side of axis X—X and that points $B_T$ and $A_B$ are aligned longitudinally of the spring and are disposed at the opposite side of the axis X—X. The load indicated P is applied at $A_T$ and $B_T$ and, as seen in Figure 1, $\frac{1}{2}P$ acts at $A_T$ and $\frac{1}{2}P$ acts at $B_T$. Similarly, the reaction is exerted $\frac{1}{2}P$ at $B_B$ and $\frac{1}{2}P$ at $A_B$.

In the spring described, when loaded between plane parallel faces the load forces and stresses on each coil are equalized therearound, and the center of gravity of the load is on the axis X—X.

Figure 2:
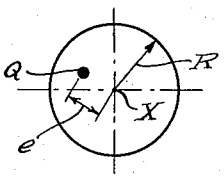
Figure 2 is a force diagram showing conditions of axial and nonaxial loading.
Figure 3:
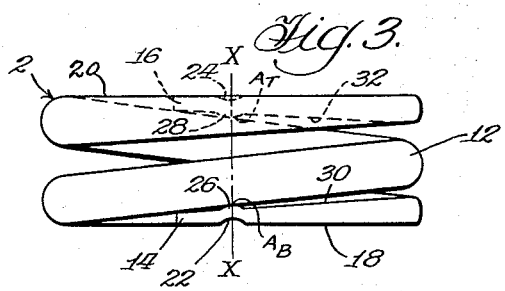
Figure 3 is a side elevational view of one form of spring made in accordance with the invention.
Figure 6:
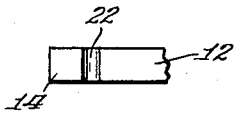
Figure 6 is a fragmentary view of one end portion of the bar taken from the seating surface thereof.
Figure 5:
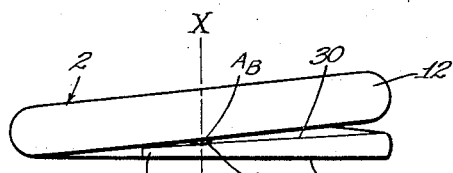
Figure 5 is a broken-apart side view of the bar from which the spring in Figures 3 and 4 is made.

Referring now to Figure 2, it will be seen that if the center of gravity of the load is on the X axis, the maximum stress around each turn is equally distributed and equals a constant K times (PR) where R is the radius of the coil centered at X. Under a nonaxial condition, the center of gravity of load P is located at a point Q which is eccentric distance $e$ from the axis X, the maximum stress on each turn is materially increased and, as well understood in the art, equals a constant K times $[P(R+e)]$ whereby the stresses around each turn are unequalized.

Figure 7:
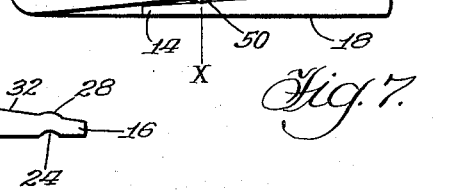
Figures 7 and 8 are fragmentary side elevational views of springs showing modifications of the invention.
Figure 8:
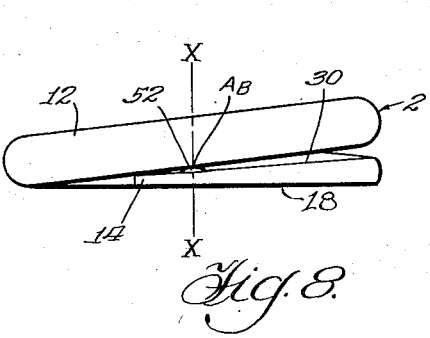
Figure 4:
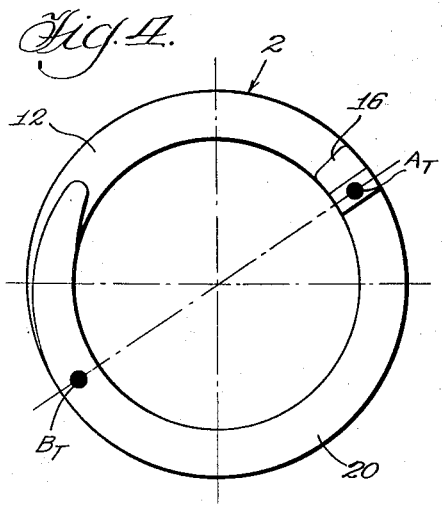
Figure 4 is an end view of the spring shown in Figure 3.

Referring now to Figures 7 and 8 wherein parts corresponding to those shown in the preceding modification are identified by corresponding reference numerals, each contact point $A_B$ or $A_T$ on spring 2 in Figure 7 is afforded by a boss or fulcrum 50 which is formed integral with or suitably secured to the second turn from each end of the coil. In Figure 8 each fulcrum or contact member 52 may be formed integral with or secured to the inner face of the associated end portion in any convenient manner, as by welding.

It will be understood that the fulcrums could be located on the members which seat against the ends of the spring and load the same, the fulcrums extending between adjacent end coils.

The spring shown in Figures 1 to 6 may be made by cutting a bar of metal to length. The bar may then be tapered at opposite ends in usual manner. The end portions of the bar may then be inserted in a press to deform the same and form the fulcrums spaced from each other a distance equal to a whole number of turns plus a half turn into which the bar is to be coiled. The bar is then coiled on a mandrel in the usual manner with the fulcrums facing inwardly of the spring. The seating surfaces on the end portions if not perpendicular to the helix axis are then ground.

The springs shown in Figures 7 and 8 may be similarly formed except that where the fulcrums are connected to the end or second turns, they may be applied before or after the bar is coiled or the bar is initially formed with the integral fulcrums, followed by the tapering, coiling and grinding steps.

It will be understood that the invention provides a novel, economical, practical, loaded spring wherein the contact points are located in the correct position to secure axial loading, and since these contact points are prevented from shifting, the desired condition of axial loading will be obtained at all loads.

I claim:
1. A straight spring bar for coiling into a helical spring having a pair of fulcrum points projecting transversely of the bar in opposed directions and being spaced from one another a whole number of turns plus one half turn when the bar is coiled with a number of turns about a helix axis to form a helical spring, said points being disposed adjacent the ends of the bar.

2. A round spring bar adapted to be coiled in a plurality of turns into a helical compression spring having tapered end portions adapted to provide flat seats for opposite ends of the spring substantially perpendicular to the axis of the spring, and fulcrum means on said end portions only adapted to engage an adjacent turn, the fulcrum on one end portion being spaced from the fulcrum on the other end portion a distance equal to a whole number of turns plus one half of a turn of said bar when coiled into a spring.

3. A helical coil spring comprising a bar having a plurality of turns encircling the axis of the spring, said bar having tapered end portions providing flat bearing surfaces at opposite ends of the spring extending perpendicular to said axis, and fulcrum means on each end portion formed as an offset thereof inwardly of the spring for engaging the succeeding turn, respective fulcrum means being spaced from each other in accordance with the following expression: $N+\frac{1}{2}$ wherein N represents a whole number of turns.

4. A helical compression spring comprising a bar encircling the axis of the spring a plurality of times, said bar being provided with flat surfaces at opposite ends affording seats for said spring substantially perpendicular to said axis, and fulcrum means on the bar adjacent each end thereof and each comprising a member disposed between the associated end turn and succeeding turn and fixed to the former and engaging the latter, said fulcrum means being located in a common axial plane of the spring at opposite sides of said axis.

5. A helical compression spring comprising a plurality of turns and end portions at opposite ends affording outwardly facing loading surfaces extending substantially perpendicular to the helix axis of the spring, inwardly facing surfaces on the end portions tangential to adjacent coils of the spring, and fulcrums at opposite sides of said axis between and engaging said inwardly facing surfaces and adjacent coils in a common plane passing through said axis.

6. In a helical spring, a bar coiled in a plurality of turns about a helix axis, said bar having tapered end turns providing flat bearing surfaces at opposite ends of the spring perpendicular to said axis, and a raised fulcrum between each end turn and the succeeding turn fixed to one thereof and engaging the other, said fulcrums being located at opposite sides of said axis in a common axial plane of said spring.

7. A helical spring comprising a plurality of turns, and a fulcrum between and engaging each end turn and adjacent turn fixed to one thereof, said fulcrums being related to each other in accordance with the following expression: $N\pi$, wherein N represents an odd integral number of turns.

8. A helical spring comprising a plurality of turns, and a fulcrum between and engaging each end turn and adjacent turn fixed to one thereof, said fulcrums being located in a common axial plane of the spring at opposite sides of the helix axis thereof.

References Cited in the file of this patent
UNITED STATES PATENTS

| Number | Name | Date |
|---|---|---|
| 361,298 | Kilmer | Apr. 19, 1887 |
| 1,250,585 | Johnson | Dec. 18, 1917 |
| 1,424,940 | Pickard | Aug. 8, 1922 |
| 1,826,060 | Eaton | Oct. 6, 1931 |
| 2,026,007 | White | Dec. 31, 1935 |
| 2,260,606 | Clark | Oct. 28, 1941 |
| 2,359,900 | Endsley | Oct. 10, 1944 |
| 2,385,357 | Haas | Sept. 25, 1945 |
| 2,387,264 | Holland | Oct. 23, 1945 |
| 2,480,783 | Sloan | Aug. 30, 1949 |